US007076083B2

(12) United States Patent
Blazey

(10) Patent No.: US 7,076,083 B2
(45) Date of Patent: Jul. 11, 2006

(54) PERSONNEL ACCESS CONTROL SYSTEM

(75) Inventor: Richard N. Blazey, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 746 days.

(21) Appl. No.: 10/317,511

(22) Filed: Dec. 12, 2002

(65) Prior Publication Data

US 2004/0114779 A1 Jun. 17, 2004

(51) Int. Cl.

*G06K 9/00* (2006.01)
*G06K 15/00* (2006.01)
*G05B 19/00* (2006.01)
*H04L 9/32* (2006.01)
*H04Q 5/22* (2006.01)

(52) U.S. Cl. ........................ 382/100; 382/115; 340/5.6; 340/5.7; 340/10.1; 358/3.28

(58) Field of Classification Search ................ 382/100, 382/115–119; 358/3.28; 340/5.2, 5.23, 5.24, 340/5.28, 5.3, 5.52, 5.53, 5.6, 5.61, 5.63, 340/5.64, 5.7, 5.82, 5.83, 10.1, 10.51, 10.52
See application file for complete search history.

(56) References Cited

U.S. PATENT DOCUMENTS 4,990,756 A * 2/1991 Hoemann ................... 235/435
5,310,999 A * 5/1994 Claus et al. ................ 235/384
5,859,920 A 1/1999 Daly et al.
6,198,381 B1 * 3/2001 Turner et al. .............. 340/10.1
6,292,092 B1 * 9/2001 Chow et al. .................. 340/5.6
6,438,251 B1 * 8/2002 Yamaguchi ................. 382/100
6,611,198 B1 * 8/2003 Geiszler et al. .......... 340/10.41
6,633,223 B1 * 10/2003 Schenker et al. .......... 340/5.53
6,817,530 B1 * 11/2004 Labrec et al. ............... 235/487
2002/0036701 A1 * 3/2002 Yamashita ............. 348/333.05
2002/0170966 A1 * 11/2002 Hannigan et al. ...... 235/462.01
2003/0057276 A1 * 3/2003 Appalucci et al. .......... 235/382
2003/0086591 A1 * 5/2003 Simon ......................... 382/115
2005/0007236 A1 * 1/2005 Lane et al. ................ 340/5.86
2005/0094848 A1 * 5/2005 Carr et al. .................. 382/100
2005/0116810 A1 * 6/2005 Beenau et al. ............. 340/5.52
2005/0284931 A1 * 12/2005 Adams et al. .............. 235/382

* cited by examiner

*Primary Examiner*—Bhavesn M. Mehta
*Assistant Examiner*—Anthony Mackowey
(74) *Attorney, Agent, or Firm*—Frank Pincelli

(57) ABSTRACT

A system is provided for controlling access at a personnel control gate, comprising: a proximity reader (38) connected to the control gate (36) for controlling access through the control gate; and an ancillary reader (40) located adjacent to the proximity reader, the ancillary reader enabled to return an RF transponder (48) signal recognizable by the proximity reader whenever the ancillary reader detects an authorized access code present on an ID badge (20), thereby causing the proximity reader to control the control gate and allow the bearer of the ID badge access through the control gate.

17 Claims, 3 Drawing Sheets

PERSONNEL ACCESS CONTROL SYSTEM

FIELD OF THE INVENTION

This invention is in the field of personnel access control systems. More particularly it is in the field of access control systems for providing limited or temporary access of personnel to a facility.

BACKGROUND OF THE INVENTION

Many organizations desire to limit access to their facilities and work sites to authorized persons only. Typical among these organizations are private companies, universities, schools, governmental agencies, military installations, and the like. Means for access control frequently involve the use of ID badge readers which in turn are linked to automatic gates or turnstiles. These automatic gates are activated to admit a person only when a valid badge is read by the reader. Often ID badges have a picture printed thereon of the badge-holder which provides an extra measure of security.

While there are a number of types of badge readers in use, an increasingly popular type is the proximity reader which does not require a badge to be physically inserted or run past a read head to operate. Proximity reader systems operate with ID badges which contain a radio frequency identification (RFID) device. An RFID is an electronic device, able to be made very thin and easily incorporated as part of an ID badge. RFIDs require no power source of their own to operate. The RFID device operates as a transponder and transmits stored information when held near a badge reader which in turn contains an RF transceiver tuned to the frequency of the RIFD. If the information transmitted by the RFID transponder is recognized as valid by the proximity reader, the gate is opened and the badge-holder is allowed access to the facility.

Since this type of RFID-containing proximity badge takes some time to make and is relatively expensive, they are not usually used for visitors and others who require only temporary authorization to enter a facility. Most often used is a simple paper badge having no image or other visitor ID which is filled out manually by a security guard. Such an ID badge is easily counterfeited and represents a security loophole that increases the risk that an unauthorized person will gain entry to a confidential or secure area.

Thus there exists a need to provide a badge making system that can quickly make inexpensive badges which may be used for visitors or other persons for whom access control is desired on a temporary basis, and which also may be recognized by an automatic access control gates controlled by proximity readers.

SUMMARY OF THE INVENTION

In answer to these and other problems of the prior art, in accordance with the present invention there is provided a system for controlling access at a personnel control gate, comprising: a proximity reader connected to the control gate for controlling access through the control gate, and an ancillary reader located adjacent to the proximity reader, the ancillary reader enabled to return an RF transponder signal recognizable by the proximity reader whenever the ancillary reader detects an authorized access code present on an ID badge, thereby causing the proximity reader to control the control gate and allow the bearer of the ID badge access through the control gate.

In accordance with another aspect of the present invention, there is also provided a system for controlling access of at least one personnel control gate, comprising: an image capture device for capturing a digital image of a visitor and storing the digital image as a data file; a computer for receiving the digital image data file, the processor enabled to embed an authorized access code in the image data file steganographically, the computer further enabled to receive additional information relative to the visitor; a printer connected to the computer for printing a ID badge, the ID badge having the image of the visitor with the authorized access code steganographically embedded in the image, the ID badge having the additional information printed thereon; a proximity reader cooperating with at least one personnel control gate to control access through the control gate; and an ancillary reader located adjacent to the proximity reader, the ancillary reader enabled to return an RF transponder signal recognizable by the proximity reader whenever the ancillary reader detects the authorized access code steganographically embedded in the image of the visitor printed on the ID badge, thereby causing the proximity reader to control the control gate and allow the visitor bearing the ID badge access through the control gate.

In accordance with yet another aspect of the present invention there is also provided a method for controlling access at a personnel control gate, comprising: detecting by an ancillary reader an authorized access code contained on an ID badge engaged therewith, the ancillary reader being placed adjacent to a proximity reader, the proximity reader cooperating with the personnel control gate to control the gate; enabling the ancillary reader when the access code is detected to return an RF transponder signal recognizable by the adjacent proximity reader; and activating the proximity reader upon recognizing the RF transponder signal from the ancillary reader to control the control gate and allow a bearer of the ID badge access through the control gate.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
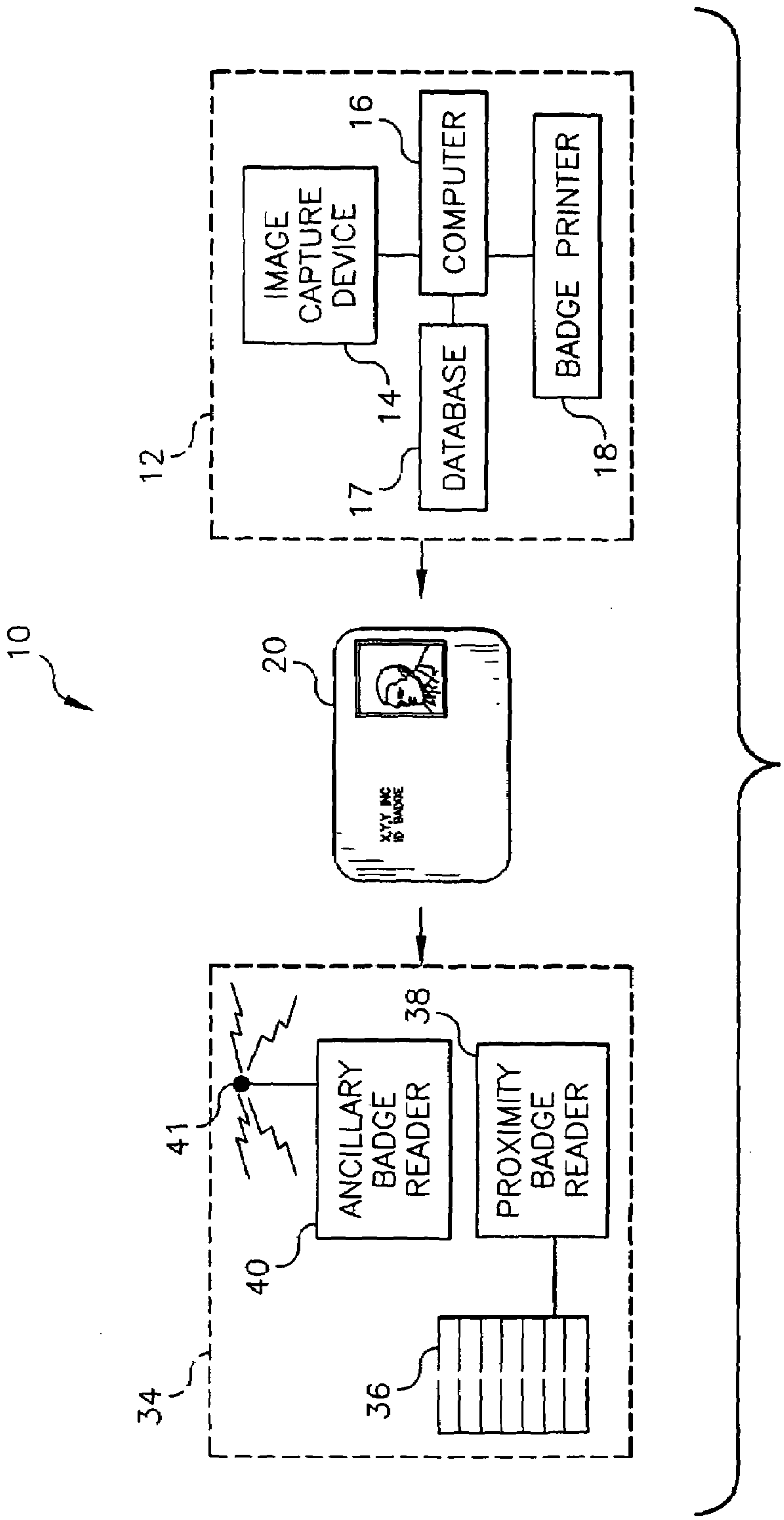
FIG. 1 depicts a schematic diagram for a personnel access control system made in accordance with the present invention.

Turning first to FIG. 1, there is shown a schematic diagram for a personnel access control system 10 made in accordance with the present invention. A badge printing station 12 is located, for example at a main entry portal of a facility where it is desired to control access by personnel.

An image capture device 14, typically a conveniently mounted digital camera, is used to capture a digital image of a visitor or other individual for whom it is desired to provide temporary access to the facility. The image data file of the captured image is transferred to and stored in a database 17 of computer 16. Computer 16 is also used to enter, and store in association with the image data file, the visiting or temporary individual's name, date and length of visit, or any other visitor identifying information such as driver's license number, social security number, and the like, which is required.

The computer 16 is also used to associate an authorized access code with the individual's other stored data. This authorized access code is a unique identifier which operates much like the very familiar Personal Identification Number (PIN) used by the bearer of a transaction card to activate the card. Any unique numeric or alphanumeric code may be used for the access code in the present invention, however. When a reader at a control gate which is programmed to recognize the authorized access code is engaged with a badge containing the code, the reader then cooperates with the control gate to admit the bearer of the access code.

For the present invention, the authorized access code is incorporated directly on the ID badge in the form of a visually indiscernible indicia which has been embedded in the visitor's previously captured and stored digital image file. When the visitor's badge is printed, the visitor's image containing this embedded code is printed on it. A means well known in the art for embedding such a visually indiscernible indicia in a digital image file is the data hiding technique known as steganography, or digital watermarking. The presence of such an indiscernible indicia or digital watermark may be detected and the access code extracted only by an appropriately equipped reader. In addition to providing a means of incorporating the authorized access code, the presence of the digital watermark also serves to authenticate the ID badge, for example by preventing a false badge being created by substituting an image which has no digital watermark. A digital watermarking technique particularly useful for hiding data in an image steganographically in this way is disclosed in commonly assigned U.S. Pat. No. 5,859,920 to Daly, et al., and the method of Daly et al. is hereby incorporated in its entirety by reference.

Badge printer 18 is used to print an ID badge 20 for the visitor. Badge printer 18 may be any digital printer capable of printing text and images, for example a laser electrophotographic printer, or an ink jet or thermal dye transfer printer.

Figure 2:
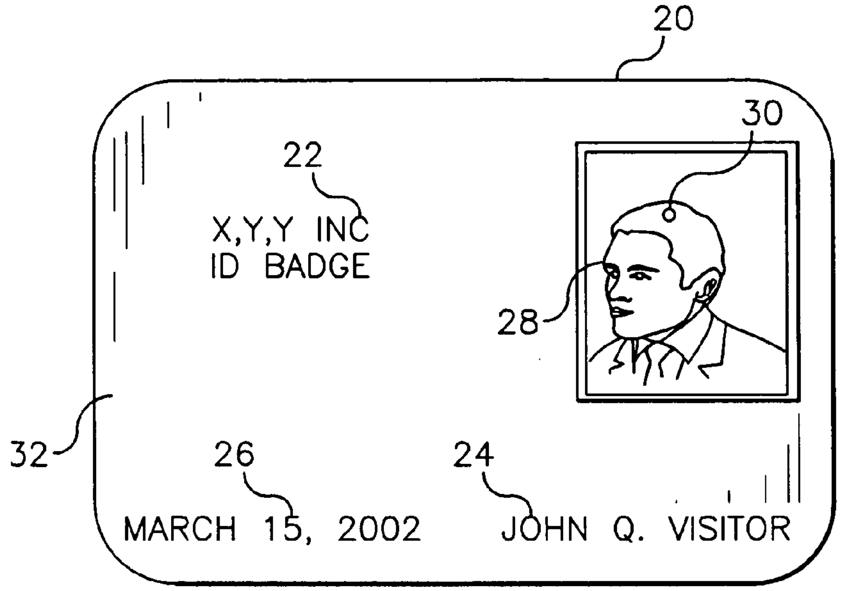
FIG. 2 is a detailed illustration of an ID badge made in accordance with the present invention.

Turning now to FIG. 2, there is provided a more detailed illustration of an ID badge 20 made in accordance with the present invention. ID badge 20 may be constructed from any of the well-known digital print media available in the marketplace for the various kinds of printers useful for badge printer 18. Typically, media useful for ID badges include paper print media of varying thickness and weight. The print media may also include an overcoat or image receiving layer as dictated by the printer employed. In addition, composite or plastic sheet media may be used in combination with an appropriate image receiving layer. Badges may be printed on individual pre-cut blanks of media which are fed to a printer, or may be cut from a sheet of media as needed by use of any well-known method of the prior art, such as use of media with pre-perforated badge-shaped blanks (not shown), or by use of a simple die cutter (not shown) to cut a printed badge from a roll of media.

Shown printed on ID badge 20 is the name and/or logo of the facility 22 for which access by personnel is being controlled. Also printed on ID badge 20 are the name 24 of the person for whom the badge is created, and the date 26 when the ID badge 20 is valid and can be used to gain entry to the facility. Although not shown in FIG. 2, it will be understood that the valid date 26 may also be represented as any period of time, ranging, for example, from only a few minutes or an hour to several days or longer, when the ID badge may be used to gain entry. The visitor's image 28, as previously discussed, has steganographically embedded in it a visually indiscernible indicia 30 containing an access code which is detectable when the ID badge 20 is engaged with an appropriate reader. The operation of this reader will be described in detail later. It will be readily understood by those of skill in the art that the visually indiscernible indicia 30 may be present on the ID badge 20 at other locations, including in the background pattern image 32, or present at a plurality of locations on the ID badge 20.

Returning now to FIG. 1, there is also shown an access control station 34 where control gate 36 physically controls access by personnel to a facility or a designated area within a control perimeter. There is provided at access control station 34 a proximity reader 38 which interrogates proximity ID badges by means of a radio transceiver when such a badge is held physically close to the proximity reader 38 by a badge holder. As described previously, such a proximity badge contains a radio frequency identification (RFID) device which acts as a transponder when it is interrogated by the proximity reader 38 and sends a access code value to the proximity reader 38. If the access code sent matches an authorized access code stored by the proximity reader 38, the proximity reader 38 cooperates with control gate 36 to activate the opening of it to admit the badge holder to the controlled area.

Ancillary reader 40, is located adjacent to proximity reader 38 in access control station 34, but not so close as to interfere with the engaging of proximity ID badges, and is used to read an ID badge such as the ID badge 20 illustrated in FIG. 2. In reference now to FIG. 3, there is illustrated a block diagram of the component parts of ancillary reader 40. When ID badge 20 is engaged with ancillary reader 40, image sensor 42 scans visitor's image 28 on ID badge 20 and produces a digital image file of the visitor's image 28. Image sensor 42 may comprise, for example, a linear array or an area array scanner (neither shown). However, any appropriate image sensor may be used. The digital image file is stored in memory 44 and is analyzed by processor 46 which detects the presence of steganographically embedded visually indiscernible indicia 30 and extracts and decodes the access code as described previously.

Figure 3:
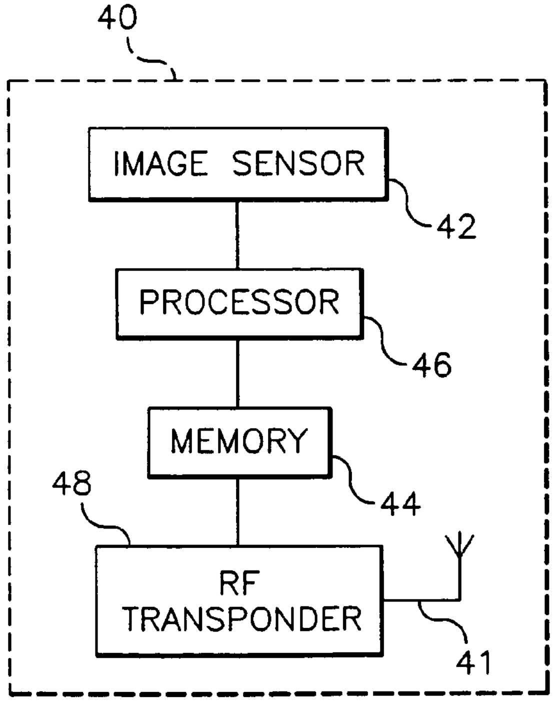
FIG. 3 depicts a schematic diagram of the component parts of ancillary reader made in accordance with the present invention.

While the various components of ancillary reader 40 are shown in FIG. 3 as individual components, it will be recognized that memory 44 and processor 46 may conveniently be combined in an application specific integrated circuit (ASIC). It will be also be recognized that image sensor 42, memory 44 and processor 46 components of ancillary reader 40 may be a fully integrated device such as a digital camera especially adapted to the purpose.

Also stored in memory 44 of ancillary reader 40 are previously programmed access codes authorized to be valid under predetermined conditions. For example, a particular access code may be authorized to admit a visitor on a particular date or series of dates. Other codes may be authorized to admit only at certain times of day, for example on just one work shift or other. Still other codes may permit access only at certain gates and not others. Authorized access codes may be changed and reprogrammed as needed either by reprogramming each reader at each gate individually or through a networked system where all readers at an installation are linked to a central control facility by a wired communications channel or a wireless network (not shown). If the access code extracted from the ID badge matches an authorized access code stored in memory 44, then processor 46 enables radio frequency (RF) transponder 48 to return the authorized access code value via antenna 41 to proximity reader 38. Thus the signal from transponder 48 exactly mimics the resulting signal which would have been received by proximity reader 38 if it had interrogated directly a proximity badge containing an RFID transponder containing the access code. When proximity reader 38 receives an authorized access code from transponder 48, it cooperates with control gate 36 to admit the visitor.

Figure 4:
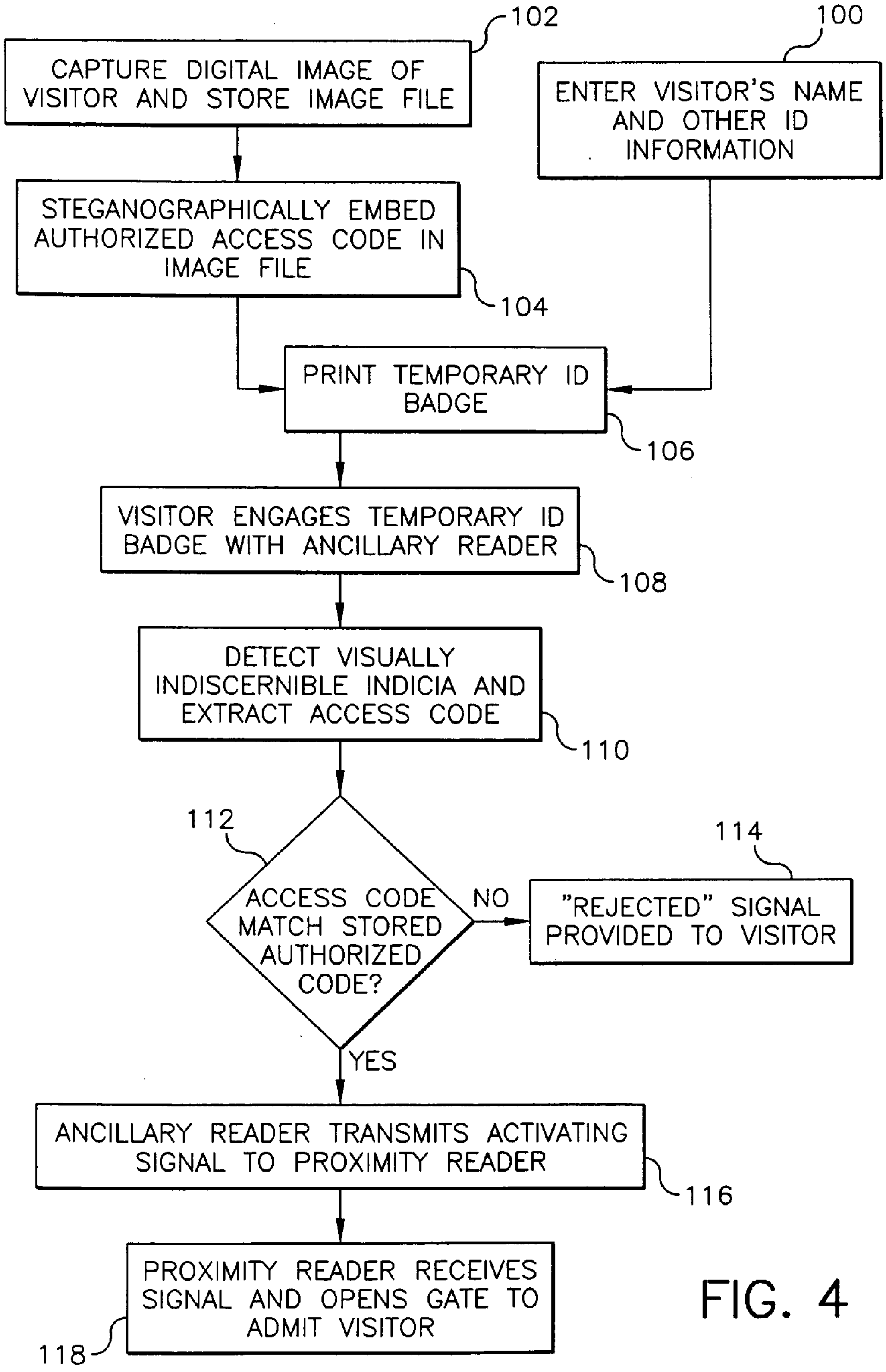
FIG. 4 shows a flow diagram of the steps in the operation of a preferred embodiment of the personnel access control system of FIG. 1.

In order to provide a more clear understanding of the invention, the steps required in its practice will now be described in detail. FIG. 4 is a flow diagram of the steps in the operation of a preferred embodiment of the personnel access control system of FIG. 1. At step 100, a visitor's name and any other required identification information for the visitor is entered into computer 16 at badge printing station 12 using an input device such as a keyboard or touch screen. Then at step 102 an image of the visitor is captured and the resulting image file stored. Next, in step 104, an authorized access code is embedded in the image file steganographically by computer 16. The visitor's name and image data is now compiled by computer 16 and printed on ID badge 20 by badge printer 18 in step 106.

When a visitor carrying a ID badge approaches an access control gate where entry is desired, he or she engages the ID badge with ancillary reader 40 (step 108). In step 110, ancillary reader 40 detects the presence of the visually indiscernible indicia embedded in step 104 and extracts the access code from it. In step 112 the extracted access code is compared to the authorized codes stored in computer 16. If the extracted code does not match a preprogrammed authorized code then a "rejected" signal is provided to the visitor in step 114 via a display device such as a display lamp or screen. If the access code does match a stored authorized code, then the ancillary reader enables the transponder 48 to reply with an authorized access code to proximity reader 38 in step 116. It is understood that proximity readers are activated when an object such as an ID card is placed at a minimum distance from the reader. That activation process can be supplied from the activated auxiliary reader either by physical means: such as by moving the antenna from the auxiliary reader closer to the proximity reader; or by electronic means such as by boosting the signal strength of the signal returned from the auxiliary reader's transponder. In step 118 the proximity reader is activated and cooperates with control gate 36 to admit the visitor.

It will be understood that while the invention has been described with respect to an embodiment where an authorized access code is provided as a visually indiscernible mark steganographically embedded in a ID badge, the invention will also operate equally well where the authorized access code is incorporated by other methods. For example, the authorized access code may be encoded in the form of a machine readable bar code. This bar code is then printed on the ID badge along with the visitor's image and other information as described previously. In this embodiment, the ancillary reader comprises a bar code reader which reads the bar code when the ID badge is engaged with it at a control gate. If the bar code read by the ancillary reader matches the pre-programmed authorized access code stored by the reader, the transponder of the ancillary reader is activated in a manner analogous to that already described for the other embodiments disclosed. With this embodiment, for security reasons, it may be desirable to change the bar coded access code frequently, for example on a daily basis, or even more frequently. Changing the access code frequently will in turn necessitate reprogramming the ancillary readers with the new authorized access codes often, but this is easily accomplished by a networked system where all readers at an installation are linked to a central control facility by a wired communications channel or a wireless network as described previously.

The invention has been described in detail with particular reference to certain preferred embodiments thereof, but it will be understood that still other variations and modifications can be effected within the scope of the invention.

PARTS LIST

| | |
|---|---|
| 10 | Personnel access control system |
| 12 | Badge printing station |
| 14 | Image capture device |
| 16 | Computer |
| 17 | Database |
| 18 | Badge printer |
| 20 | ID badge |
| 22 | Facility |
| 24 | Name |
| 26 | Date |
| 28 | Visitor's image |
| 30 | Visually indiscernible indicia |
| 32 | Background pattern image |
| 34 | Access control station |
| 36 | Control gate |
| 38 | Proximity reader |
| 40 | Ancillary reader |
| 41 | Antenna |
| 42 | Image sensor |
| 44 | Memory |
| 46 | Processor |
| 48 | RF transponder |
| 100 | Step |
| 102 | Step |
| 104 | Step |
| 106 | Step |
| 108 | Step |
| 110 | Step |
| 112 | Step |
| 114 | Step |
| 116 | Step |
| 118 | Step |

What is claimed is:

1. A system for controlling access at a personnel control gate, comprising:

a proximity reader connected to said control gate for controlling access through said control gate; and an ancillary reader located adjacent to said proximity reader, said ancillary reader enabled to return an RF transponder signal recognizable by said proximity reader whenever said ancillary reader detects an authorized access code present on an ID badge, thereby causing said proximity reader to control said control gate and allow the bearer of said ID badge access through said control gate.

2. A system according to claim 1 wherein said authorized access code is steganographically embedded in an image printed on said ID badge.

3. A system according to claim 2 wherein said ancillary reader further comprises:

a sensor for scanning said image on said ID badge and producing a digital image file of said image;

a processing unit for analyzing said digital image file for detecting and extracting said authorized access code steganographically embedded therein; and an RF transponder connected to said processing unit and enabled to return a signal recognizable by said proximity reader when said authorized access code is detected by said processing unit.

4. The system of claim 2 wherein said sensor further comprises a linear array scanner.

5. A system according to claim 2 wherein said sensor further comprises an area array scanner.

6. A system according to claim 2 wherein said ancillary reader further comprises:

a digital camera enabled for capturing said image on said ID badge and producing a digital file of said image, said digital camera having an image processor for analyzing said digital file and detecting and extracting said authorized steganographic access code embedded therein; and an RF transponder connected to said digital camera and enabled to return a signal recognizable by said proximity reader when said authorized access code is detected by said processor.

7. A system according to claim 1 wherein said ancillary reader is programmed to respond to said authorized access code only for a predetermined time period.

8. A system according to claim 1 wherein said ancillary reader is programmed to recognize a plurality of said authorized access codes, each said access code recognizable only for an associated predetermined period of time.

9. A system according to claim 2 wherein said image on said ID badge having said authorized access code embedded therein comprises an image of a visitor desiring ID access through said personnel control gate.

10. A system of claim 2 wherein said image on said ID badge having said authorized access code embedded therein comprises a background pattern image.

11. A system for controlling access of at least one personnel control gate, comprising:

an image capture device for capturing a digital image of a visitor and storing said digital image as a data file;

a computer for receiving said digital image data file, said processor enabled to embed an authorized access code in said image data file steganographically, said computer further enabled to receive additional information relative to said visitor;

a printer connected to said computer for printing a ID badge, said ID badge having said image of said visitor with said authorized access code steganographically embedded in said image, said ID badge having said additional information printed thereon;

a proximity reader cooperating with said at least one personnel control gate to control access through said control gate; and an ancillary reader located adjacent to said proximity reader, said ancillary reader enabled to return an RF transponder signal recognizable by said proximity reader whenever said ancillary reader detects said authorized access code steganographically embedded in said image of said visitor printed on said ID badge, thereby causing said proximity reader to control said control gate and allow said visitor bearing said ID badge access through said control gate.

12. A system according to claim 1 wherein said authorized access code is encoded in a bar code printed on said ID badge.

13. A system according to claim 12 wherein said ancillary reader further comprises:

a bar code reader for reading said barcode printed on said ID badge;

a processing unit for decoding said authorized access code from said barcode; and an RF transponder connected to said processing unit and enabled to return a signal recognizable by said proximity reader when said authorized access code is decoded by said processing unit.

14. A method for controlling access at a personnel control gate, comprising:

detecting by an ancillary reader an authorized access code contained on an ID badge engaged therewith, said ancillary reader being placed adjacent to a proximity reader, said proximity reader cooperating with said personnel control gate to control said gate;

enabling said ancillary reader when said access code is detected to return an RF transponder signal recognizable by said adjacent proximity reader; and activating said proximity reader upon recognizing said RF transponder signal from said ancillary reader to control said control gate and allow a bearer of said ID badge access through said control gate.

15. A method according to claim 14 wherein said authorized access code is steganographically embedded in an image printed on said ID badge.

16. A method according to claim 14 wherein said step of detecting said authorized access code further comprises the steps of:

scanning by a sensor said image on said ID badge and producing a digital image file of said image; and analyzing by a processor said digital image file for detecting and extracting said authorized access code steganographically embedded therein.

17. A method for controlling access through at least one personnel control gate, comprising:

capturing a digital image of a visitor and storing said digital image as a data file;

receiving and storing additional information relative to said visitor;

embedding steganographically, by use of computer, an authorized access code in said visitor image data file;

printing a ID badge, said ID badge having said image of said visitor with said authorized access code embedded and said additional information printed thereon;

scanning said ID badge by an ancillary reader placed in proximity to a proximity reader, said ancillary reader enabled to activate an RF transponder signal recognizable by said proximity reader whenever said ancillary reader detects said steganographically embedded authorized access code in said identity document;

receiving by said proximity reader said RF transponder signal; and allowing access through said control gate by said proximity reader cooperating with said control gate, thereby allowing said visitor bearing said ID badge access through said gate.

* * * * *